United States Patent
Bui et al.

(10) Patent No.: US 6,587,303 B1
(45) Date of Patent: Jul. 1, 2003

(54) SERVO CONTROL OF A COARSE ACTUATOR

(75) Inventors: Nhan Xuan Bui, Tucson, AZ (US); John Alexander Koski, Tucson, AZ (US); Akimitsu Sasaki, Yokohama (JP); Kazuhiro Tsuruta, Sagamihara (JP)

(73) Assignee: International Business Machines Corporation, Armonk, NY (US)

(*) Notice: Subject to any disclaimer, the term of this patent is extended or adjusted under 35 U.S.C. 154(b) by 521 days.

(21) Appl. No.: 09/590,673

(22) Filed: Jun. 9, 2000

(51) Int. Cl.[7] ............................................. G11B 5/596
(52) U.S. Cl. ................... 360/78.12; 360/78.05
(58) Field of Search .................... 360/77.12, 78.05, 360/78.12, 135; 369/30.16, 44.28, 44.35

(56) References Cited

U.S. PATENT DOCUMENTS

| | | | | |
|---|---|---|---|---|
| 4,627,039 A | * | 12/1986 | Meyer ..................... | 369/44.28 |
| 4,839,876 A | * | 6/1989 | Fennema ................ | 369/30.16 |
| 4,935,835 A | * | 6/1990 | Godwin et al. .......... | 360/135 |
| 5,060,210 A | | 10/1991 | Fennema et al. ........ | 369/32 |
| 5,090,002 A | | 2/1992 | Chow et al. ............. | 369/44.28 |
| 5,235,574 A | * | 8/1993 | Aviles et al. ............ | 369/53.19 |
| 5,339,299 A | * | 8/1994 | Kagami et al. .......... | 369/30.13 |
| 5,379,170 A | | 1/1995 | Schwarz .................. | 360/109 |
| 5,425,013 A | * | 6/1995 | Fennema et al. ........ | 369/44.35 |
| 6,376,964 B1 | * | 4/2002 | Young et al. ............ | 310/311 |

* cited by examiner

Primary Examiner—David Hudspeth
Assistant Examiner—Fred F. Tzeng
(74) Attorney, Agent, or Firm—John H. Holcombe

(57) ABSTRACT

A servo system and method position a head laterally with respect to defined servo tracks, employing fine and coarse actuators. A servo control integrates the position error between the head and a desired position in accordance with a predetermined function, and operates the coarse actuator to translate the fine actuator and the head in accordance with the integrated position error. A position error signal loop is coupled to a servo sensor for determining position error for operating the fine actuator to translate the head in a manner to reduce the position error. The position error signal loop may have a compensator function with both integration and other functions. A coarse servo control comprises a connection coupled to the compensator function for providing an integration control representing the integration function of the position error signal loop; and a driver coupled to the connection, operating the coarse actuator to translate the fine actuator and the head in accordance with the integration signal.

25 Claims, 5 Drawing Sheets

SERVO CONTROL OF A COARSE ACTUATOR

FIELD OF THE INVENTION

This invention relates to servo systems for accessing and following defined servo tracks, and, more particularly, to servo systems having compound actuators comprising a coarse actuator and a fine actuator mounted on the coarse actuator.

BACKGROUND OF THE INVENTION

In data recording on data storage media having high track density, such as magnetic tape or optical disk, a compound actuator, which comprises a coarse actuator and a fine actuator mounted on the coarse actuator, provides both a large working dynamic range and high bandwidth. Thus, the data head can be translated between tracks over a full width of the magnetic tape or between the inner and outer tracks of an optical disk, using the coarse actuator, and can track follow the movement of a track, using the fine actuator.

In the typical compound actuator, the fine actuator function follows the track guiding disturbances, as determined by a servo sensor which senses servo tracks, to position the data head in the center of the desired data track or tracks. It has relatively small mass and wide bandwidth and is thus able to follow high frequency disturbances. However, it has a very limited range of travel in order to provide the high bandwidth. The fine actuator servo system typically has a compensator function which is designed to enable maximum bandwidth with adequate stability margins. Examples are Chow et al., U.S. Pat. No. 5,090,002, and Fennema et al., U.S. Pat. No. 5,060,210. The coarse actuator carries the fine actuator from track to track and also aids in centering the fine actuator, typically by having a relative position sensor to sense if the fine actuator is substantially in the center of its range with respect to the coarse actuator on which it is mounted. Thus, if the fine actuator drifts substantially off-center during track following, the relative position sensor detects this movement and causes the servo system to correct the coarse actuator in the direction that the fine actuator has moved off-center.

As the heads and actuators become increasingly miniaturized, a difficulty with a relative position sensor is that the space in which to mount the relative position sensor and the electronic circuits associated with it becomes too small. Additionally, the cost of such a precise, high resolution sensor is detrimental.

SUMMARY OF THE INVENTION

An object of the present invention is to allow tracking of the fine actuator by the coarse actuator while eliminating the relative position sensor.

A servo system and method are disclosed for positioning a head laterally with respect to defined servo tracks, employing fine and coarse actuators. A servo control integrates the position error between the head and a desired position in accordance with a predetermined function, and operates the coarse actuator to translate the fine actuator and the head in accordance with the integrated position error. In one embodiment, a servo sensor senses lateral position of the head with respect to the defined servo tracks. A position error signal loop is coupled to the servo sensor for determining position error between the head and the desired position related to the defined servo tracks, for operating the fine actuator to translate the head in a manner to reduce the determined position error. The position error signal loop has a compensator function that includes an integrator and other transfer function elements such as a lead-lag function. The coarse servo control, for operating the coarse actuator, comprises a connection coupled to the position error signal loop compensator function for providing control to the coarse actuator from the position error integration signal representing the integration function of the position error signal loop; and a driver coupled to the connection, operating the coarse actuator to translate the fine actuator and the head in accordance with the integration signal.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

The present invention relates to servo systems having compound actuators comprising a coarse actuator and a fine actuator mounted on the coarse actuator, and both actuators operating in substantially the same directions. Examples of such servo systems are implemented in magnetic tape drives and in optical disk drives. Such servo systems and the associated compound actuators are known to those of skill in the art, and, as is also known to those of skill in the art, such servo systems and compound actuators may be implemented in other technologies as well, such as optical tape and magnetic disk. Many examples of compound actuators are known to those of skill in the art, and which may implement the present invention. FIGS. 1–5 represent two such examples.

Figure 1:
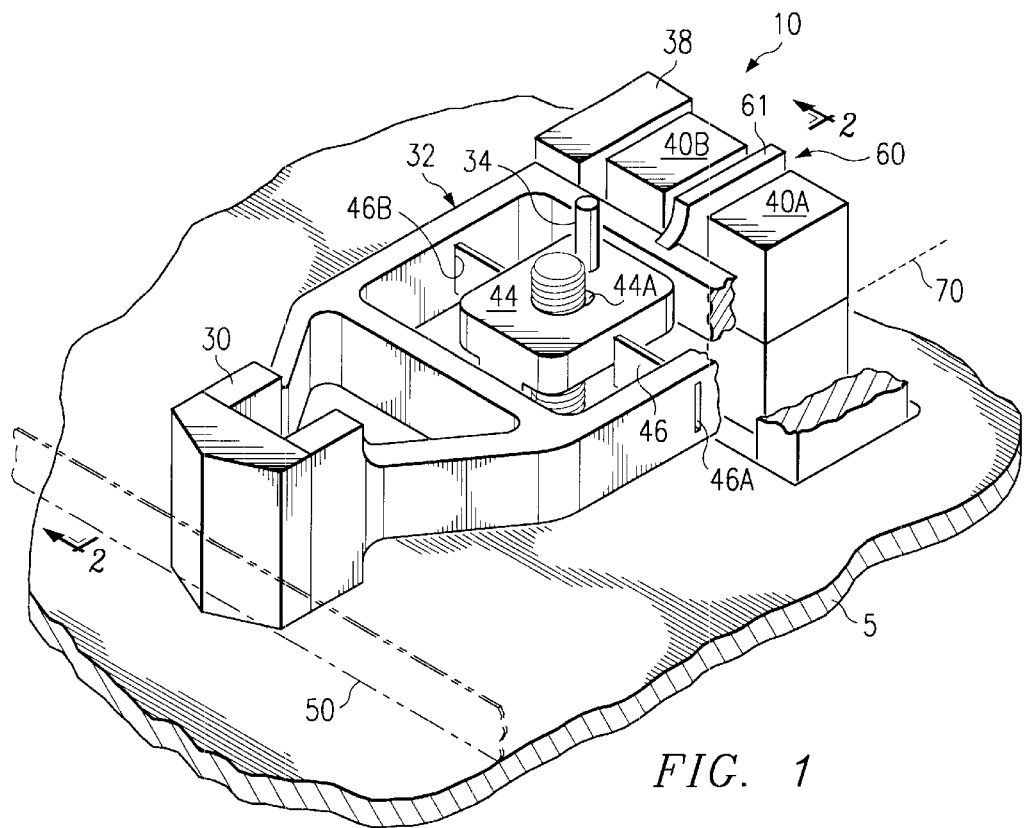
FIG. 1 is an isometric view of a magnetic head and compound actuator which may be employed to implement the present invention.
Figure 2:
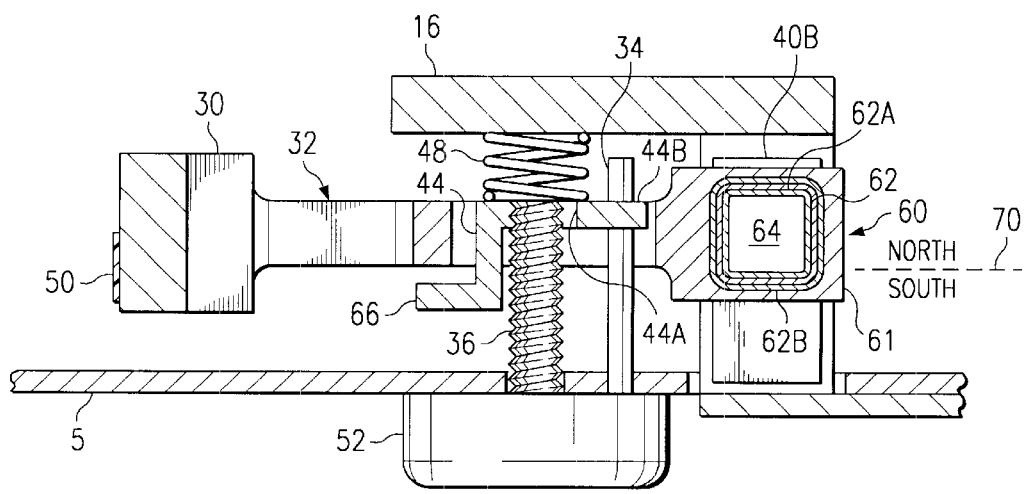
FIG. 2 is a partially cutaway side view of the magnetic head and compound actuator of FIG. 1.

Referring to FIGS. 1 and 2, an embodiment of a compound actuator and a magnetic tape head are illustrated. A more detailed description of a compound actuator for a magnetic tape may be found in Schwarz, U.S. Pat. No. 5,379,170.

Briefly, a magnetic head and actuator assembly 10 comprises an actuator arm 32 mounting a magnetic tape head 30. A coarse actuator motor 52 drives a lead screw 36 to move stage 44 at an aperture 44A in a vertical direction perpendicular to a base 5. An aperture 44B is provided to receive an anti-rotation pin 34, and a load spring 48 is provided between a housing 16 and the stage 44. A torsion spring 46 is fixed to the stage 44 and is coupled at its ends 46A and 46B to the actuator arm 32 so that the stage 44 moves the head 30 mounted on the actuator arm 32 in a vertical direction across the tape to access tracks of a recording tape 50 which moves along a transport path and across the magnetic tape head 30.

A fine actuator coil assembly 60 is attached to an end of the actuator arm 32. The coil assembly 60 comprises a coil frame 61, a coil 62, and a mandrel 64. The coil 62 has an upper portion 62A and a lower portion 62B, and is disposed between magnets 40A and 40B held in a magnet housing 38 which are arranged to split the north and south poles at approximately the line 70. The coil moves vertically upon application of a current at the coil 62 and causes the actuator arm 32 to pivot about torsion spring 46 and move the magnetic head 30 transversely of the tape 50 to make small adjustments such as in track following mode.

Figure 3:
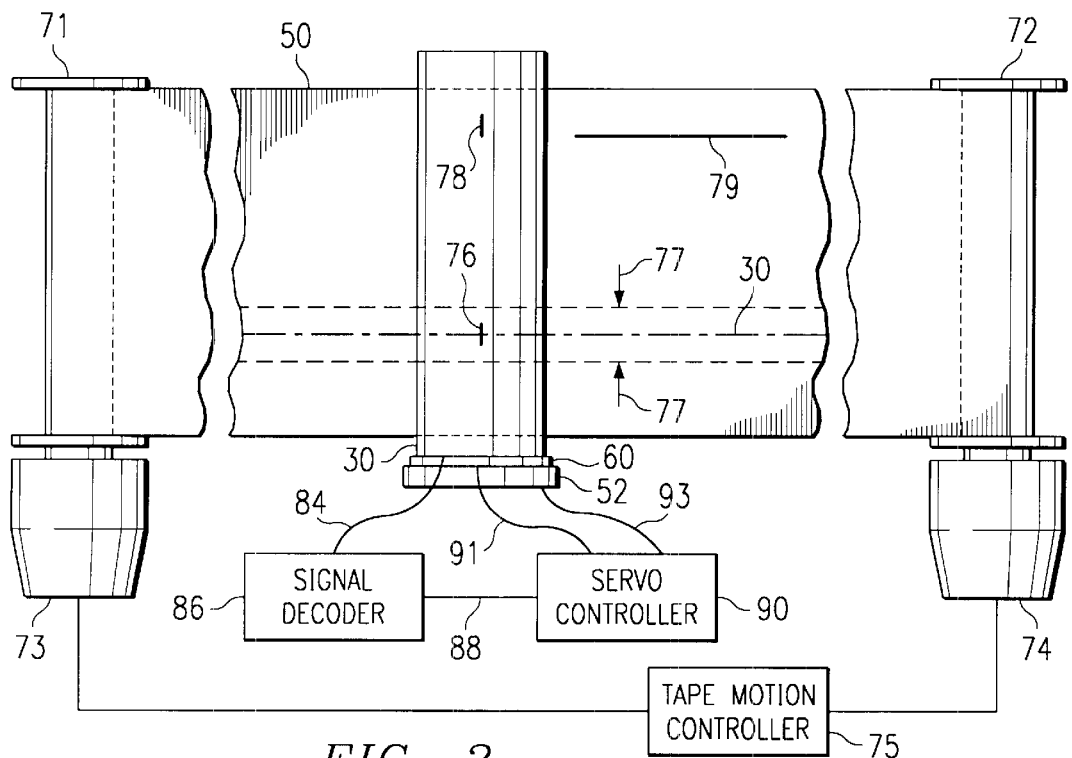
FIG. 3 is a block and diagrammatic illustration of the magnetic head of FIGS. 1 and 2, with a magnetic tape drive system and a servo system which may implement the present invention.

Referring to FIG. 3, a tape drive and servo system for a compound actuator are illustrated. The tape 50 is moved along a transport path across the magnetic tape head 30 between reels 71 and 72 by reel motors 73 and 74 under the control of a tape motion controller 75. The magnetic head assembly 30 comprises a servo read head or sensor 76 that senses a servo pattern recorded in a servo track 77 of the tape 50. The servo read head 76 may comprise a plurality of servo read sensors at various positions of the magnetic head assembly, and the servo track 77 may comprise a number of parallel servo tracks of the tape. A data head 78, which may comprise several data read/write transducers, is shown positioned over a data track region 79 of the tape, for example, containing a plurality of parallel data tracks. As is understood by those of skill in the art, typically, the defined servo tracks of magnetic tape systems are parallel to and offset from the data tracks. The desired centerline 80 of a desired servo track 77 is illustrated, and extends along the length of the tape 50. As the tape is moved along the transport path, the servo read head 76 reads the servo signals which are provided on a servo signal line 84 to a servo decoder 86. The servo decoder processes the received servo signals and generates a position signal that is provided on a position signal line 88 to a servo controller 90. The servo controller responds to a seek signal to cause the coarse actuator 52 to move between tracks, and responds to the position signals to generate servo control signals on line 91 to operate the fine actuator 60 to follow the desired centerline of the desired servo track, and to generate servo control signals on line 93 to cause the coarse actuator 52 to tend to move the fine actuator in the direction of the desired centerline, as will be discussed.

Figure 4:
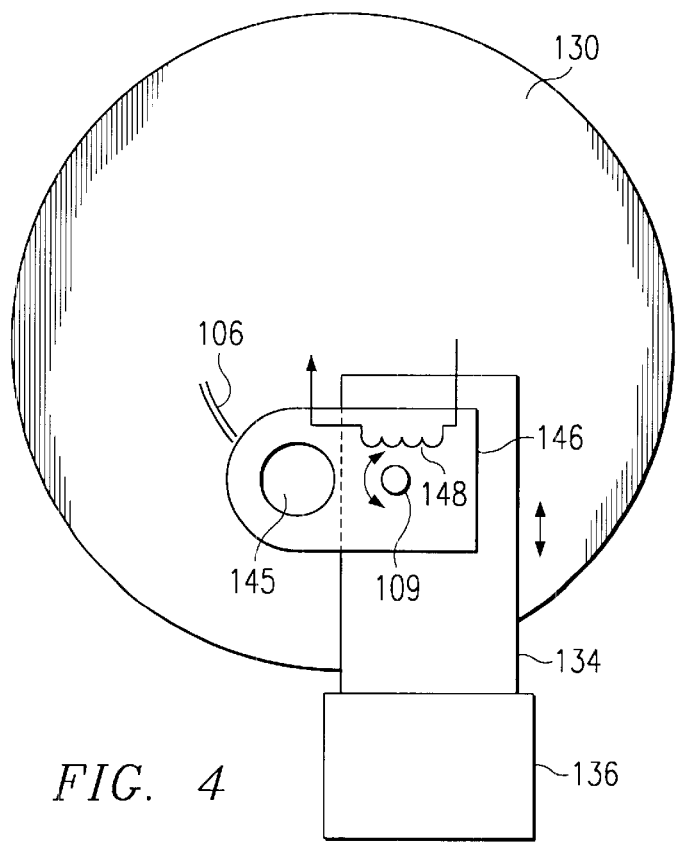
FIG. 4 is a diagrammatic illustration of an optical head, disk, and compound actuator which may be employed to implement the present invention.
Figure 5:
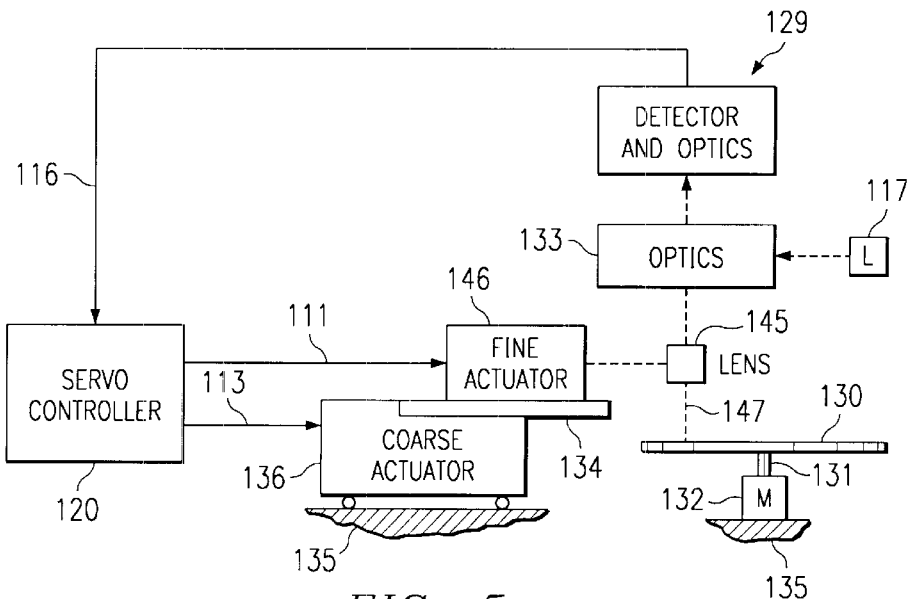
FIG. 5 is a block and diagrammatic illustration of the optical head, disk, and compound actuator of FIG. 4, with an optical disk drive system and a servo system which may implement the present invention.

Referring to FIGS. 4 and 5, an embodiment of a compound actuator and an optical disk drive and servo system are illustrated. A more detailed description of a compound actuator for an optical disk may be found in Fennema et al., U.S. Pat. No. 5,060,210.

A coarse actuator 136 moves an arm 134 laterally of tracks 106 of an optical disk 130. Mounted on the arm 134 is a rotary fine actuator 146 arranged for rotation about pivot pin 109 which is secured to the arm 134. A lens 145 is suitably mounted at a distal end of the fine actuator 146 to focus the beam of a laser 117 onto the optical disk 130. The optical disk is mounted for rotation on a spindle 131 by a motor 132. A frame 135 mounts the motor 132 and suitably mounts the coarse actuator 136 for reciprocal movement laterally of the tracks 106. The movement of the coarse actuator enables access to any of the plurality of concentric tracks 106 of the optical disk. The optics of the optical drive may comprise an objective or focusing lens 145 and optical elements 133 for controlling the beam and for allowing the transfer of data. The bi-directional beam is denoted by numeral 147. As is understood by those of skill in the art, the optical disk tracks are typically molded and provide the defined servo track servo information as well as a surface for the data recording medium. A data and servo detector 129 converts the reflected beam into data and servo information and supplies position servo information on line 116 to a servo controller 120. The servo controller responds to a seek signal to cause the coarse actuator 136 to move between tracks, and responds to the position signals to generate servo control signals on line 111 to operate, e.g., a coil 148 of the fine actuator 146, to move the lens 145 to follow the desired centerline of the desired track, and to generate servo control signals on line 113 to cause the coarse actuator 136 to tend to move the fine actuator in the direction of the desired centerline, as will be discussed.

As discussed above, many other examples of compound actuators are known to those of skill in the art, and may implement the present invention. Some examples include linear or parallelogram fine and/or coarse actuators, operated by analog motors, or analog or digitally driven stepper motors.

Figure 6:
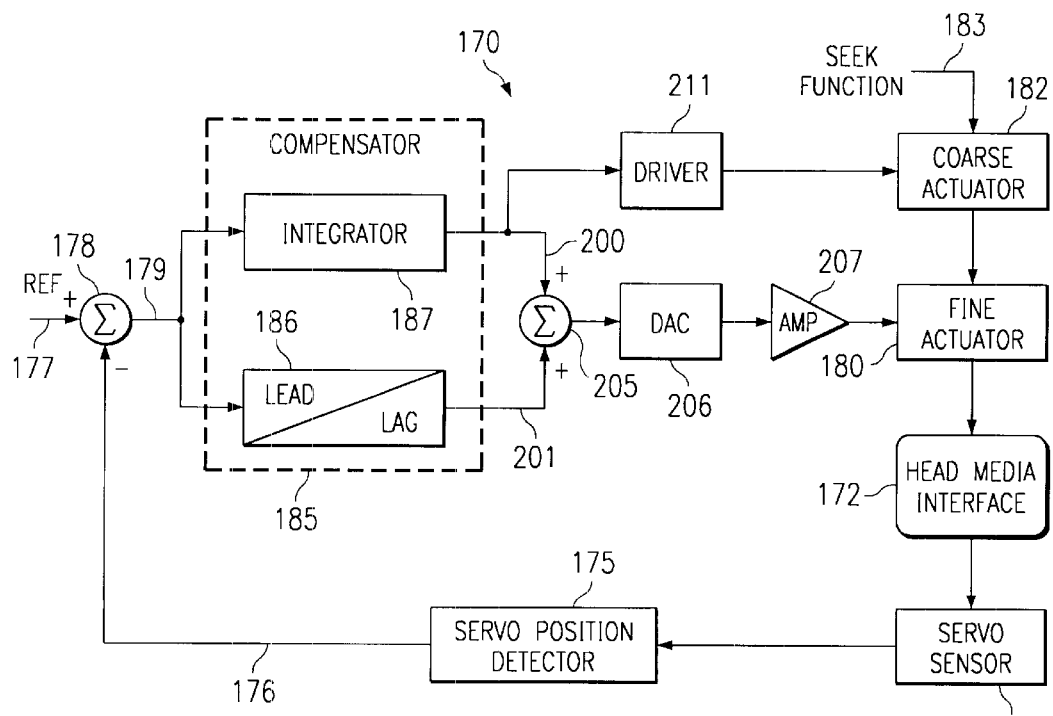
FIG. 6 is a block diagram of an embodiment of a servo system in accordance with the present invention.

An embodiment of a servo controller 90 or 120 is illustrated in FIG. 6 as part of the servo system 170. The elements of the drives, servo sensors, detectors and actuators of FIGS. 1–5 are illustrated generically in FIG. 6. The servo signals are sensed by a servo sensor 171 from ahead to media interface 172. The position of the servo sensor relative to a servo track is detected from the servo signals by a servo position detector 175. The detected position signals are provided on line 176 and preferably comprise digital signals. The position signals are then compared to a reference signal 177 by a comparator 178 to determine position error between the head and a desired position related to the defined servo tracks, called the "position error signal", or "PES", on line 179.

In the typical compound actuator, the fine actuator 180 follows the track guiding disturbances, as determined by the PES, to position the data head in the center of the data track or tracks. It has relatively small mass and wide bandwidth and is thus able to follow high frequency disturbances. However, it has a very limited range of travel in order to provide the high bandwidth. The coarse actuator 182 carries the fine actuator from track to track in accordance with the seek function 183. The fine actuator servo system typically has a compensator function 185 in the position error signal loop, which is designed to enable maximum bandwidth with adequate stability margins.

The compensator function 185 modifies the PES signal by applying a variable gain to the PES signal, which gain is based upon the frequency of the input PES signal 179, or, from another viewpoint, upon the rates of change of the input PES signal.

The compensator function 185 includes an integrator 187 and other transfer function elements, such as a lead/lag functional element 186, to acheive the desired static and dynamic system performance and overall stability. Each element may be implemented as a filter, either an analog filter employing discrete components, or a digital filter, such as an IIR (infinite impulse response) or as a FIR (finite impulse response), or as microcode causing a microprocessor to perform the function.

Figure 7A:
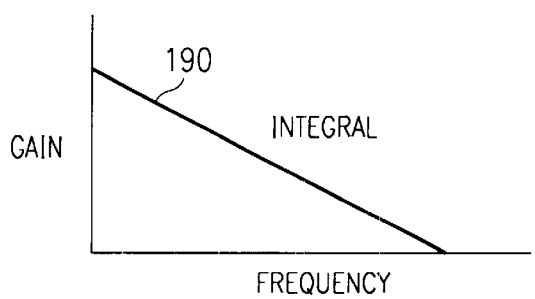
FIGS. 7A, 7B and 7C are illustrations of exemplary gain vs. frequency response characteristics of a compensator function of the servo system of FIG. 6.
Figure 7B:
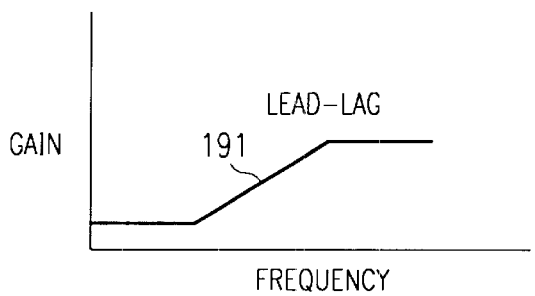
Figure 7C:
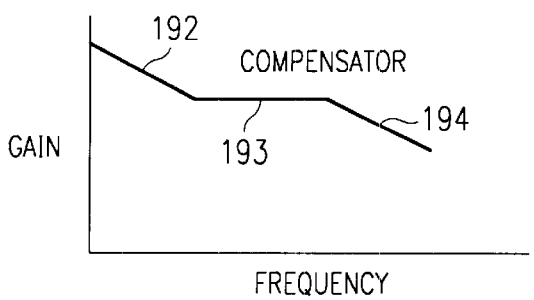

FIGS. 7A, 7B and 7C illustrate exemplary frequency response characteristics for the integrator 187, the lead/lag element 186, and for the combined elements comprising the compensator function 185, respectively. The integrator 187 provides a response 190 which generally reduces the gain as the frequency increases. The lead/lag element 186 provides a response 191 which is enhanced at high frequencies and reduced at low frequencies. The combined response is shown in FIG. 7C, and provides the highest gain 192 at the lower frequencies, dropping to a stable middle range 193, and then dropping again 194 at the higher frequencies. The result is that the gain provided by the compensator function 185 allows the servo controller to apply the gain to the PES and provide a servo signal to the fine actuator 180 that has both high bandwidth and stability, as is understood by those of skill in the art. The integrator applies the gain to the current PES and integrates the current signal with prior signals. This results in a integration function signal on connection 200, and the lead/lag gain as applied to the PES results in a signal on line 201. The signals are summed by a summer 205 and, if digital, are supplied to a digital to analog converter 206. A power amplifier 207 then applies the signal to the fine actuator 180, operating the fine actuator to translate the head in a manner to reduce the determined position error. Alternatively, a digital driver may be employed to operate the fine actuator 180.

In accordance with the present invention, the coarse actuator tracks the fine actuator without requiring a relative position sensor. Specifically, the PES is integrated, employing the integrator 187 of the compensator function 185, and the integration function output is provided to control the coarse actuator 182. The integrator 187 may be implemented as a filter, either an analog filter employing discrete components, or a digital filter, preferably as an IIR which may be implemented as discrete circuits, or as microcode, as discussed above. The integration function output signal on connection 200 provides an integration control signal to a driver 211, which drives the coarse actuator 182, operating the coarse actuator to translate the fine actuator 180 in accordance with the integrated PES signal on connection 200. If the coarse actuator 182 is a stepper motor, the driver 211 is preferably digital up-down logic and a stepper driver. Thus, if the integration function output signal exceeds a positive threshold, the driver 211 operates the stepper motor to step in one direction, and if the integration function output signal exceeds a negative threshold, the driver 211 operates the stepper motor to step in the opposite direction. A step of the stepper motor may result in a linear translation of the fine actuator, for example, of 3 microns. Alternatively, if the coarse actuator is analog, the driver 211 may convert the digital signal to analog and employ a power amplifier to operate the coarse actuator 182.

Figure 8A:
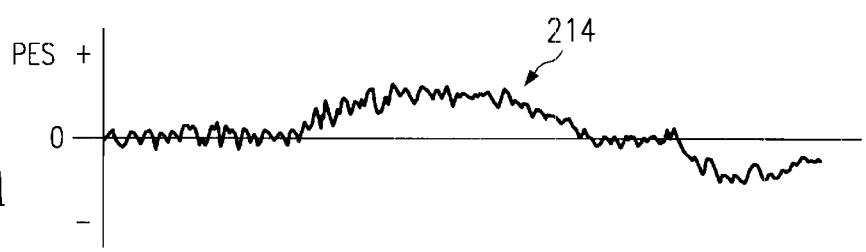
FIGS. 8A and 8B are illustrations of the PES and integral signals of the servo system of FIG. 6.
Figure 8B:
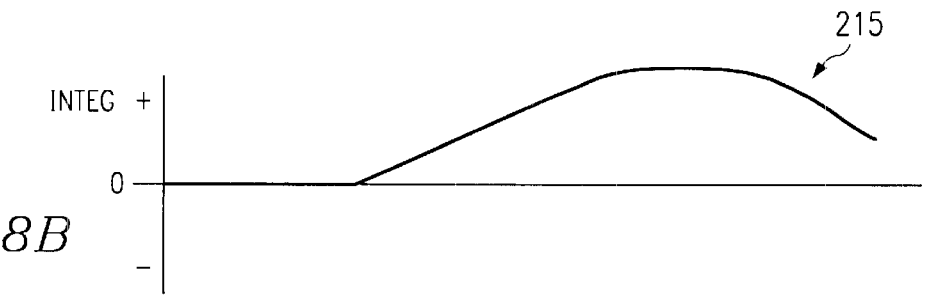

FIG. 8A illustrates an example of a PES signal 214 at line 179, representing the difference between the servo position signal on line 176 and the reference signal on line 177. FIG. 8B illustrates an integration function signal 215, e.g., by integrator 187 on line 200, of the position error signal loop (PES) signal 214 of FIG. 8A. For example, so long as the head is at or oscillates about the desired position, the integration function signal 215 remains at substantially zero. But, as disturbances at the head media interface 172 cause the PES to grow in a single direction, which disturbances may be countered to some extent by the servo controller operating the fine actuator 180, the integration function 215 grows. If the PES decreases toward zero, the integration function will gradually stop increasing, and if the PES changes sign, the integration function 215 will begin decreasing, and may also change sign if the PES remains or grows in the opposite direction.

The integration function signal on line 200 is employed, in accordance with the present invention, to operate the coarse actuator 182 to translate the fine actuator 180 in accordance with the integration function, so that the coarse actuator tracks the integral or long-term average error of the fine actuator, allowing the fine actuator to become more centered with respect to the desired position. In effect, the integration function replaces the relative position of the fine actuator versus its center, rest position on the coarse actuator for the desired position. The coarse actuator thus becomes positioned such that the fine actuator remains at its rest position over the long term average.

Figure 9:
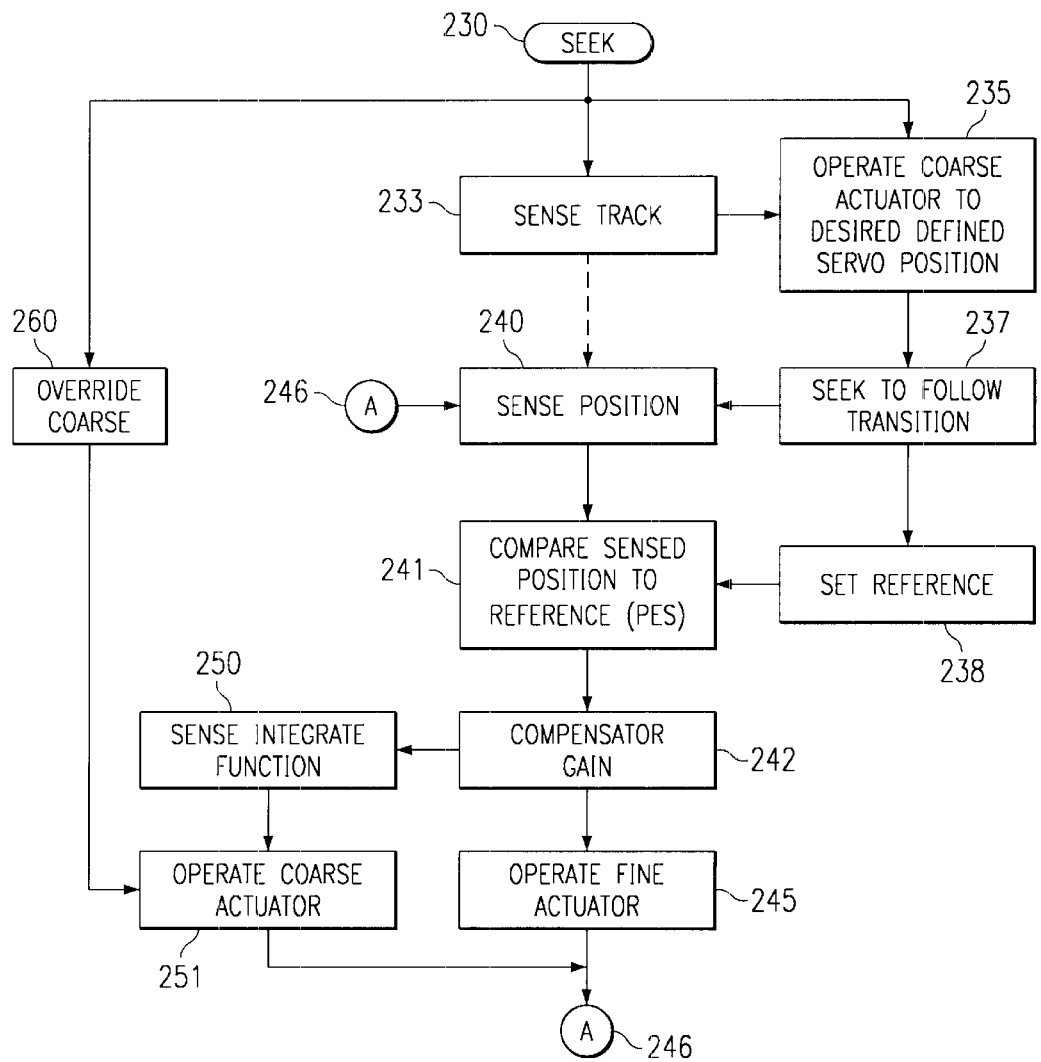
FIG. 9 is a flow chart depicting an embodiment of the method of the present invention.

FIG. 9 illustrates an embodiment of the method of the present invention. Referring additionally to FIG. 6, a seek input is provided at step 230 to move the head to a desired track. Information decoded from the servo sensor 171 or from a separate track sensor indicates the current track location of the servo head in step 233. In step 235, the servo controller provides a seek function 183 to operate the coarse actuator 182 to translate the fine actuator 180 and head between ones of the desired positions to substantially align the head with one of the desired positions as defined by the servo sensor with respect to the defined servo tracks. Steps 233 and 235 may comprise a continuing process until the servo sensor indicates that the correct desired track position has been reached, as is known to those of skill in the art.

Upon reaching the desired track, the process transitions from a seek operation to a track following operation in step 237. The process transition may be made gradually, for example, by conducting track following as soon as the head reaches the vicinity of the desired track during the seek, or suddenly, by switching from a seek to track following when the head reaches the desired track, both as known to those of skill in the art.

Upon conducting track following, in step 238, the reference value is set on line 177. At the same time, in step 240, the servo signals are sensed by servo sensor 171 from the head to media interface 172, and the position is detected from the servo signals by the servo position detector 175. In step 241, the position signals are then compared to the reference signal 177 of step 238 by comparator 178 to determine the position error between the head and a desired position related to the defined servo tracks, or "PES". In step 242, the compensator function 185 modifies the PES signal by applying a variable gain, employing the lead/lag drives element 186 and integrator 187. The resultant signal is converted from digital to analog if needed and amplified by drive amplifier 207, operating the fine actuator 180 in step 245. Connector 246 depicts the continuous nature of the track following function, cycling back to again conduct steps 240, 241, 242 and 245, still employing the same reference set in step 238.

At the same time, and in accordance with the present invention, the integration function of the compensator is sensed at output 200 in step 250. The integration function signal on line 200 is also converted from digital to analog if needed and amplified by drive amplifier 211 and employed in step 251 to operate the coarse actuator 182 to translate the fine actuator 180 in accordance with the integration function. Thus, the coarse actuator tracks the fine actuator, allowing the fine actuator to become more centered with respect to the desired position. Connector 246 again depicts the continuous nature of the track following function, in accordance with the present invention, of both the fine and the coarse actuators.

Upon a seek to a different track, as represented by step 230, the seek function will be conducted as discussed above, and, additionally, the seek function, in step 260, overrides the coarse actuator integration function until the seek is completed and the transition is made back to track following in step 237. The step of overriding the coarse actuator integration function may comprise applying a much larger seek function at line 183 that swamps the integration function signal, or may comprise actively switching from the integration function when switching from track following to the seek function. Once the track following function is resumed in step 237, the track following of the fine actuator and the integration function operation of the coarse actuator 182 in steps 242, 250 and 251 resume.

Thus, the present invention allows limited tracking of the fine actuator by the coarse actuator while eliminating a relative position sensor.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a servo system for positioning a head laterally, said servo system comprising a servo sensor for sensing lateral position of said head with respect to defined servo tracks, a fine actuator for translating said head laterally with respect to said defined servo tracks, a coarse actuator for translating said fine actuator laterally with respect to said defined servo tracks, and a position error signal loop coupled to said servo sensor for determining position error between said head and a desired position related to said defined servo tracks, for operating said fine actuator to translate said head in a manner to reduce said determined position error, said position error signal loop having a compensator function with both integration and other transfer functions, a method for operating said coarse actuator, comprising:

sensing said integration function of said position error signal loop; and operating said coarse actuator to translate said fine actuator and said head in accordance with said sensed integration function.

2. The method of claim 1, wherein said operating step comprises applying a lateral positioning signal to said coarse actuator directly related to said sensed integration function.

3. The method of claim 2, wherein said position error signal loop compensator function comprises a digital filter, and wherein said operating step additionally comprises digitally driving said coarse actuator.

4. The method of claim 1, additionally comprising the step of operating said coarse actuator to translate said fine actuator and said head between ones of said desired positions relative to said defined servo tracks to substantially align said head with one of said desired positions as defined by said servo sensor with respect to said defined servo tracks, said operation overriding said operation of said coarse sensor in accordance with said sensed integration function.

5. In a servo system for positioning a head laterally, said servo system comprising a servo sensor for sensing lateral position of said head with respect to defined servo tracks, a fine actuator for translating said head laterally with respect to said defined servo tracks, and a coarse actuator for translating said fine actuator laterally with respect to said defined servo tracks, a method for operating said coarse actuator, comprising:

determining position error between said head and a desired position related to said defined servo tracks;

integrating said determined position error in accordance with a predetermined function; and operating said coarse actuator to translate said fine actuator and said head in accordance with said integrated position error of said integrating step.

6. The method of claim 5, wherein said operating step comprises applying a lateral positioning signal to said coarse actuator directly related to said integrated position error of said integrating step.

7. The method of claim 6, wherein said integrating step additionally comprises filtering said position error.

8. The method of claim 7, wherein said integrating step additionally comprises digitally filtering said position error, and said operating step additionally comprises digitally driving said coarse actuator.

9. The method of claim 5, additionally comprising the step of operating said coarse actuator to translate said fine actuator and said head between ones of said desired positions relative to said defined servo tracks to substantially align said head with one of said desired positions as defined by said servo sensor with respect to said defined servo tracks, said operation overriding said operation of said coarse sensor in accordance with said integrated position error of said integrating step.

10. A servo system for positioning a head laterally with respect to defined servo tracks, comprising:

a servo sensor for sensing lateral position of said head with respect to said defined servo tracks;

a fine actuator for translating said head laterally with respect to said defined servo tracks;

a coarse actuator for translating said fine actuator laterally with respect to said defined servo tracks; and a servo control coupled to said servo sensor for operating said fine actuator and said coarse actuator, said servo control responsive to said servo sensor to determine position error between said head and a desired position related to said defined servo tracks, and operating said fine actuator to translate said head in a manner to reduce said determined position error; and said servo control integrating said determined position error in accordance with a predetermined function, and operating said coarse actuator to translate said fine actuator and said head in accordance with said integrated position error.

11. The servo system of claim 10, wherein said servo control provides a lateral positioning signal to said coarse actuator, said lateral positioning signal directly related to said integrated position error.

12. The servo system of claim 11, wherein said servo control comprises a filter for integrating said position error in accordance with said predetermined function.

13. The servo system of claim 12, wherein said servo control integrating filter additionally comprises a digital filter providing a digitally filtered integrated position error control signal in accordance with said predetermined function, and said servo control additionally comprises a digital driver responsive to said digitally filtered integrated position error control signal for operating said coarse actuator.

14. The servo system of claim 10, additionally comprising a track to track control for operating said coarse actuator to translate said fine actuator and said head between ones of said desired positions relative to said defined servo tracks to substantially align said head with one of said desired positions as defined by said servo sensor with respect to said defined servo tracks, said track to track control overriding said servo control operation of said coarse actuator during said track to track translation.

15. A data storage system, comprising:
 a data storage medium having a plurality of defined servo tracks;
 a data head assembly for recording and reading data on said data storage medium;
 a drive for moving said data storage medium with respect to said data head assembly;
 a servo sensor for sensing lateral position of said data head assembly with respect to said defined servo tracks;
 a fine actuator for translating said data head assembly laterally with respect to said defined servo tracks;
 a coarse actuator for translating said fine actuator laterally with respect to said defined servo tracks; and
 a servo control coupled to said servo sensor for operating said fine actuator and said coarse actuator, said servo control responsive to said servo sensor to determine position error between said head and a desired position related to said defined servo tracks, and operating said fine actuator to translate said head in a manner to reduce said determined position error; and said servo control integrating said determined position error in accordance with a predetermined function, and operating said coarse actuator to translate said fine actuator and said head in accordance with said integrated position error.

16. The data storage system of claim 15, wherein said servo control provides a lateral positioning signal to said coarse actuator, said lateral positioning signal directly related to said integrated position error.

17. The data storage system of claim 16, wherein said servo control comprises a filter for integrating said position error in accordance with said predetermined function.

18. The data storage system of claim 17, wherein said servo control integrating filter additionally comprises a digital filter providing a digitally filtered integrated position error signal in accordance with said predetermined function, and said servo control additionally comprises a digital driver responsive to said digitally filtered integrated position error signal for operating said coarse actuator.

19. The data storage system of claim 15, additionally comprising a track to track control for operating said coarse actuator to translate said fine actuator and said head between ones of said desired positions relative to said defined servo tracks to substantially align said head with one of said desired positions as defined by said servo sensor with respect to said defined servo tracks, said track to track control overriding said servo control operation of said coarse actuator during said track to track translation.

20. The data storage system of claim 19, wherein said data storage medium comprises a magnetic tape, and wherein said data head assembly comprises a multi-track magnetic head having read and write transducers and said servo sensor is mounted with said data head assembly.

21. The data storage system of claim 19, wherein said data storage medium comprises an optical disk, and wherein said data head assembly comprises an optical head having a movable lens and associated optical elements for reading and writing and comprising said servo sensor.

22. In a servo system for positioning a head laterally, said servo system comprising a servo sensor for sensing lateral position of said head with respect to defined servo tracks, a fine actuator for translating said head laterally with respect to said defined servo tracks, a coarse actuator for translating said fine actuator laterally with respect to said defined servo tracks, and a position error signal loop coupled to said servo sensor for determining position error between said head and a desired position related to said defined servo tracks, for operating said fine actuator to translate said head in a manner to reduce said determined position error, said position error signal loop having a compensator function with both integration and other transfer functions, a coarse servo control for operating said coarse actuator, comprising:
 a connection coupled to said position error signal loop compensator function for providing an integration control signal representing said integration function of said position error signal loop; and
 a driver coupled to said connection, operating said coarse actuator to translate said fine actuator and said head in accordance with said integration control signal.

23. The coarse servo control of claim 22, wherein said driver provides a lateral positioning signal to said coarse actuator directly related to said coupled connection integration signal.

24. The coarse servo control of claim 23, wherein said position error signal loop compensator function comprises a digital filter providing a digitally filtered integrated signal, and wherein said driver comprises a digital driver responsive to said digitally filtered coupled connection integration control signal to operate said coarse actuator.

25. The coarse servo control of claim 22, additionally comprising a track to track control for operating said coarse actuator to translate said fine actuator and said head between ones of said desired positions relative to said defined servo tracks to substantially align said head with one of said desired positions as defined by said servo sensor with respect to said defined servo tracks, said track to track control overriding said driver operation of said coarse actuator during said track to track translation.

* * * * *

UNITED STATES PATENT AND TRADEMARK OFFICE
CERTIFICATE OF CORRECTION

PATENT NO. : 6,587,303 B1
DATED : July 1, 2003
INVENTOR(S) : Bui et al.

It is certified that error appears in the above-identified patent and that said Letters Patent is hereby corrected as shown below:

<u>Column 8,</u>
Line 3, change "coarse sensor" to -- coarse actuator --
Line 37, change "coarse sensor" to -- coarse actuator --

Signed and Sealed this

Thirtieth Day of September, 2003

JAMES E. ROGAN
*Director of the United States Patent and Trademark Office*